US012687918B2

(12) United States Patent
Sivagnanenthirarajah et al.

(10) Patent No.: US 12,687,918 B2
(45) Date of Patent: Jul. 21, 2026

(54) SYSTEMS AND METHODS FOR SENSOR-AGNOSTIC REPRESENTATION OF HUMAN PRESENCE INFORMATION

(71) Applicant: Microsoft Technology Licensing, LLC, Redmond, WA (US)

(72) Inventors: Ugan Sivagnanenthirarajah, Seattle, WA (US); Michael Jeffrey Ajax, Redmond, WA (US); Sathyanarayanan Karivaradaswamy, Sammamish, WA (US); Robert Eugene Harris, Jr., Woodinville, WA (US); Sarah Barnette, Seattle, WA (US); Sergii Viktorovych Liashenko, Edmonds, WA (US); Sanjeev Chandra Reddy, Redmond, WA (US); Sayak Chatterjee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 18/630,196

(22) Filed: Apr. 9, 2024

(65) Prior Publication Data

US 2025/0130631 A1 Apr. 24, 2025

Related U.S. Application Data

(60) Provisional application No. 63/592,017, filed on Oct. 20, 2023.

(51) Int. Cl.
*G06F 3/01* (2006.01)
*G06F 21/84* (2013.01)

(52) U.S. Cl.
CPC .............. *G06F 3/012* (2013.01); *G06F 21/84* (2013.01)

(58) Field of Classification Search
CPC ....... G06F 3/012; G06F 21/84; G06F 21/6245
See application file for complete search history.

(56) References Cited

U.S. PATENT DOCUMENTS

| | | | | |
|---|---|---|---|---|
| 11,042,649 B1 * | 6/2021 | John | ..................... | G06V 40/171 |
| 2010/0328074 A1 * | 12/2010 | Johnson | .................. | G06F 21/31 340/573.1 |

(Continued)

OTHER PUBLICATIONS

"Spherical Coordinates"; Aug. 20, 2022; The MathWorks, Inc., https://web.archive.org/web/20220820042151/https://www.mathworks.com/help/phased/ug/spherical-coordinates.html, (Year: 2022).*

(Continued)

*Primary Examiner* — Brian Whipple

(57) ABSTRACT

Systems and methods for sensor-agnostic representation of human presence information are described. An operating system of a computing device with a display screen is configured to receive, from a sensor system, human presence information representing the position and posture of one or more persons detected by a sensor of the sensor system, where the human presence information is determined based on a coordinate system associated with the display screen. The human presence information has the same format regardless of the sensor technology. The human presence information includes an elevation angle, an azimuth angle, a face pitch, a face roll, and/or a face yaw of the person relative to the sensor and/or display screen. The operating system may use the human presence information to implement privacy-related features and/or may provide the human presence information to one or more applications via an API.

20 Claims, 9 Drawing Sheets

(56)                 References Cited

U.S. PATENT DOCUMENTS

2014/0113646 A1*   4/2014   Maggenti ................ H04L 67/04
                                                              455/452.1
2018/0249274 A1*   8/2018   Lyren ...................... H04S 7/303
2023/0105353 A1*   4/2023   Smith ................... G07F 19/206
                                                              705/72
2023/0259328 A1*   8/2023   Umezawa ............... H04S 7/304
                                                              715/727

OTHER PUBLICATIONS

"3 Security Features Every Notebook Should Have—HP EliteBook Showcase", Retrieved From: https://www.youtube.com/watch?v=dGKVn4C5N_g&t=57s, May 23, 2018, 3 Pages.

"Create Restricted Token function (securitybaseapi.h)", Retrieved From: https://learn.microsoft.com/en-us/windows/win32/api/securitybaseapi/nf-securitybaseapi-createrestrictedtoken, Oct. 13, 2021, 6 Pages.

"Duplicate Token Ex function (securitybaseapi.h)", Retrieved From: https://learn.microsoft.com/en-us/windows/win32/api/securitybaseapi/nf-securitybaseapi-duplicatetokenex, Oct. 13, 2021, 4 Pages.

"HID Sensors Usages", In Whitepaper of Microsoft, Oct. 22, 2015, 163 Pages.

"Human Presence Sensor Class", Retrieved From: https://learn.microsoft.com/en-us/uwp/api/windows.devices.sensors.humanpresencesensor?view=winrt-22621, Retrieved Date: Oct. 18, 2023, 3 Pages.

"Human Presence Settings Class", Retrieved From: https://learn.microsoft.com/en-us/uwp/api/windows.devices.sensors.humanpresencesettings?view=winrt-22621, Retrieved Date: Oct. 18, 2023, 3 Pages.

"Java Project Tutorial—Make Login and Register Form Step by Step Using NetBeans And MySQL Database", Retrieved From: https://www.youtube.com/watch?v=3vauM7axnRs, Mar. 5, 2019, 4 Pages.

"Laptop Presence and Onlooker Detection with IWRL6432", Retrieved From: https://www.ti.com/video/6317244314112, Mar. 1, 2023, 2 Pages.

"Po Register Power Setting Callback function (ntifs.h)", Retrieved From: https://learn.microsoft.com/en-us/windows-hardware/drivers/ddi/ntifs/nf-ntifs-poregisterpowersettingcallback, Jul. 7, 2023, 5 Pages.

"Power Set Request function", Retrieved From: https://learn.microsoft.com/en-us/windows/win32/api/winbase/nf-winbase-powersetrequest, Jul. 27, 2022, 3 Pages.

"Prerequisites", Retrieved From: https://github.com/microsoft/busiotools/blob/master/sensors/tracing/README.md, Jan. 13, 2023, 2 Pages.

"Set Token Information function (securitybaseapi.h)", Retrieved From: https://learn.microsoft.com/en-us/windows/win32/api/securitybaseapi/nf-securitybaseapi-settokeninformation, Oct. 13, 2021, 3 Pages.

"Shoulder Surfing (computer security)", Retrieved From: https://en.wikipedia.org/wiki/Shoulder_surfing_%28computer_security%29, Oct. 4, 2023, 5 Pages.

"What is Shoulder surfing?", Retrieved From: https://www.ionos.com/digitalguide/server/security/shoulder-surfing/, Oct. 1, 2023, 8 Pages.

Abzarian, et al., "HID Usage Tables for Universal Serial Bus (USB)", Retrieved From: https://www.usb.org/sites/default/files/hut1_21_0.pdf, Oct. 12, 2020, 319 Pages.

Batchelor, et al., "App capability declarations", Retrieved From: https://learn.microsoft.com/en-us/windows/uwp/packaging/app-capability-declarations#device-capabilities, Oct. 11, 2023, 35 Pages.

Coppock, Mark, "Dell Precision 5470 Review: too Small to be Effective", Retrieved From: https://www.digitaltrends.com/computing/dell-precision-5470-review/, Sep. 7, 2022, 21 Pages.

Dinardi, Gaetano, "What Is Shoulder Surfing? How It Happens & How to Avoid It", Retrieved From: https://www.aura.com/learn/shoulder-surfing, Jun. 19, 2023, 17 Pages.

Golden, et al., "Camera privacy shutters and kill switches", Retrieved From: https://learn.microsoft.com/en-us/windows-hardware/drivers/stream/camera-privacy-controls, Jan. 20, 2023, 16 Pages.

Golden, et al., "Privacy shutter/switch notification", Retrieved From: https://learn.microsoft.com/en-us/windows-hardware/drivers/stream/privacy-shutter-notification, Jun. 30, 2022, 6 Pages.

Graff, et al., "Audio subsystem power management for modern standby platforms", Retrieved From: https://learn.microsoft.com/en-us/windows-hardware/design/device-experiences/audio-subsystem-power-management-for-modern-standby-platforms#power-management-modes, Aug. 24, 2023, 17 Pages.

Graff, et al., "Windows Hardware Compatibility Program", Retrieved From: https://learn.microsoft.com/en-us/windows-hardware/design/compatibility/, Jun. 25, 2021, 1 Page.

Hopkins, et al., "Introduction to the Sensor and Location Platform in Windows", Retrieved From: https://learn.microsoft.com/en-us/windows-hardware/drivers/sensors/, Jan. 20, 2022, 4 Pages.

Hopkins, et al., "Lock on leave", Retrieved from: https://learn.microsoft.com/en-us/windows-hardware/design/device-experiences/sensors-presence-lock-on-leave, May 12, 2023, 5 Pages.

Hopkins, et al., "Selective suspend for HID over USB devices", Retrieved From: https://learn.microsoft.com/en-us/windows-hardware/drivers/hid/selective-suspend-for-hid-over-usb-devices, May 5, 2023, 4 Pages.

Hopkins, et al., "Wake on approach", Retrieved from: https://learn.microsoft.com/en-us/windows-hardware/design/device-experiences/sensors-presence-wake-on-approach, May 12, 2023, 5 Pages.

Hudek, et al., "Manufacturing Windows Engineering Guide (WEG)", Retrieved From: https://web.archive.org/web/20220218174336/https://docs.microsoft.com/en-us/windows-hardware/manufacture/desktop/manufacturing-windows-engineering-guide?view=windows-11, Feb. 17, 2023, 23 Pages.

Hudek, et al., "Unattended Windows Setup Reference", Retrieved From: https://learn.microsoft.com/en-us/windows-hardware/customize/desktop/unattend/, Jun. 25, 2021, 2 Pages.

Hudek, et al., "Using an Extension INF File", Retrieved From: https://learn.microsoft.com/en-us/windows-hardware/drivers/install/using-an-extension-inf-file, May 8, 2023, 9 Pages.

Northrup, et al., "Display Settings Overview", Retrieved From: https://learn.microsoft.com/en-us/windows-hardware/customize/power-settings/display-settings, Apr. 21, 2020, 2 Pages.

Smith, et al., "Dim display brightness", Retrieved From: https://learn.microsoft.com/en-us/windows-hardware/customize/power-settings/display-settings-dim-display-brightness, Apr. 11, 2020, 1 Page.

Smith, et al., "Sensors Power Management", Retrieved From: https://learn.microsoft.com/en-us/windows-hardware/design/device-experiences/sensors-power-management-for-modern-standby-platforms, May 3, 2021, 16 Pages.

Symanovich, Steve, "What Is Shoulder Surfing?", Retrieved From: https://lifelock.norton.com/learn/identity-theft-resources/what-is-shoulder-surfing, Sep. 14, 2017, 5 Pages.

Wojciakowski, et al., "Sensors", Retrieved From: https://learn.microsoft.com/en-us/windows/uwp/devices-sensors/ sensors, May 7, 2023, 9 Pages.

"Dell Client Solutions Dell Optimizer", Retrieved From: https://www.delltechnologies.com/asset/en-us/solutions/business-solutions/briefs-summaries/top-four-productivity-benefits-of-dell-optimizer.pdf, Retrieved From: Oct. 11, 2023, 10 Pages.

"Dell Optimizer 2.0", Retrieved From: https://www.dell.com/support/kbdoc/en-us/000184590/dell-optimizer-2-0, Jul. 11, 2023, 2 Pages.

"Latitude 7330/7430/7530 Premium look. Premium options.", Retrieved From: https://www.delltechnologies.com/asset/en-us/products/laptops-and-2-in-1s/technical-support/latitude-7x30-spec-sheet.pdf, Retrieved From: Oct. 11, 2023, 10 Pages.

"Learn HTML5 and CSS3 For Beginners—Crash Course", Retrieved From: https://www.youtube.com/watch?v=vQVVIgd7hV4A, Dec. 7, 2019, 2 Pages.

"SR Face Metrics—An object that Represents Metrics about the User's face", Retrieved From: https://developer.apple.com/documentation/sensorkit/srfacemetrics, Retrieved From: Oct. 11, 2023, 2 Pages.

(56)            References Cited

OTHER PUBLICATIONS

Gu, et al., "MMSense: Multi-Person Detection and Identification via mmWave Sensing", In Proceedings of 3rd ACM Workshop on Millimeter-wave Networks and Sensing Systems, Oct. 25, 2019, pp. 45-50.

Hopkins, et al., "Presence Sensing", Retrieved From: https://learn.microsoft.com/en-us/windows-hardware/design/device-experiences/sensors-presence-sensing, Dec. 5, 2023, 3 Pages.

Spoonauer, Mark, "Lenovo ThinkPad X1 Fold 2022 Hands-on: A Better Foldable-Screen Laptop", Retrieved From: https://www.tomsguide.com/reviews/lenovo-thinkpad-x1-fold-2022, Sep. 1, 2022, 18 Pages.

* cited by examiner

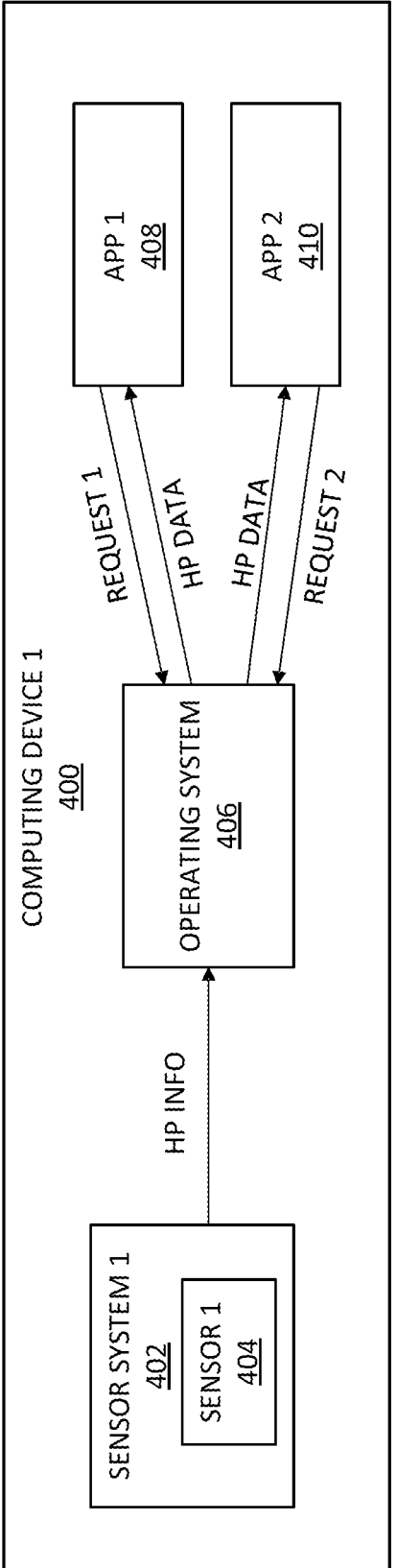
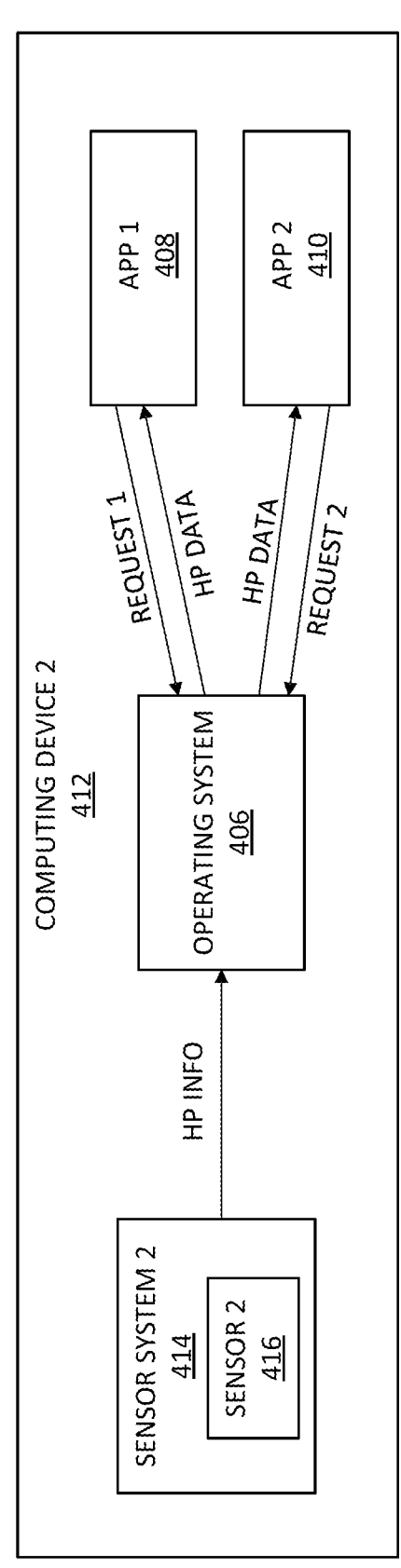
FIG. 4

506

502

502

504

APP 1

506

502

504

600

RECEIVE, FROM A REQUESTING APPLICATION, A REQUEST FOR CURRENT HUMAN PRESENCE INFORMATION — 602

IN RESPONSE TO RECEIVING THE REQUEST, OBTAIN, FROM THE SENSOR SYSTEM, HUMAN PRESENCE INFORMATION — 604

TRANSMIT REQUEST TO SENSOR SYSTEM FOR HUMAN PRESENCE INFORMATION — 606

RECEIVE HUMAN PRSENCE INFORMATION FOR ONE OR MORE PERSONS DETECTED BY THE SENSOR SYSEM — 608

PROVIDE HUMAN PRESENCE DATA TO REQUESTING APPLICATION — 610

PERFORM OPERATING SYSTEM CONTROL FUNCTION — 612

FIG. 6

SYSTEMS AND METHODS FOR SENSOR-AGNOSTIC REPRESENTATION OF HUMAN PRESENCE INFORMATION

CROSS-REFERENCE TO RELATED APPLICATIONS

This application claims the benefit of U.S. Provisional Application No. 63/592,017 filed Oct. 20, 2023, entitled "Systems and Methods for Sensor-Agnostic Representation of Human Presence Information," which is incorporated herein by reference in its entirety.

BACKGROUND

Sensor-based human presence detection can be used for implementing functionality that is based on the detected persons or other objects within the field of view of the sensor. For example, some computing devices include hardware and algorithms that can detect one or more persons within the field of view of sensor(s). Different types of sensors may result in different types of outputs in terms of format and content. Accordingly, in order for an application to use the sensor data, the application must first know what type of sensor is being used and how that sensor generates its output signals. If the application is unaware of a particular sensor type or the expected output from the sensor, the application may not be able to detect or process objects within the field of view. Or, even if the application is capable of processing the outputs from the sensor, the positions or other details of the detected objects may be incorrect.

It is with respect to these and other considerations that examples are presented herein. In addition, although relatively specific problems have been discussed, it should be understood that the examples should not be limited to solving the specific problems identified in the background.

SUMMARY

Examples described in this disclosure relate to systems and methods for sensor-agnostic representation of human presence information. An operating system of a computing device with a display screen is configured to receive, from a sensor system, human presence information representing one or more persons detected by a sensor of the sensor system, where the human presence information is determined based on a consistent coordinate system, such as a coordinate system associated with the display screen. The operating system may use the human presence information to implement privacy-related features and/or may provide the human presence information to one or more applications via an API.

As an example, the position and posture of the person(s) detected by the sensor system may be provided in a consistent coordinate system that includes a distance, elevation angle and azimuth angle for each of the persons detected. The coordinates are based on the head or face position of the detected persons in some examples. For instance, the distance is represented as a distance from the origin to the head or face of the person. The elevation angle is an angle between a distance vector and a projection vector which is a projection of the distance vector onto a plane (e.g., X-Y plane), which may be orthogonal to a plane of the display screen. The azimuth angle represents the detected person's viewing angle on the same plane as the projection vector. Face angles for each detected person may also be provided in a sensor agnostic manner. For instance, face angles may be provided as face pitch, face roll, and face yaw.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 4 depicts systems for sensor-agnostic representation of human presence information in accordance with some examples;

FIG. 6 depicts a flowchart of an example method for sensor-agnostic representation of human presence information in accordance with some examples;

DETAILED DESCRIPTION

Figure 1:
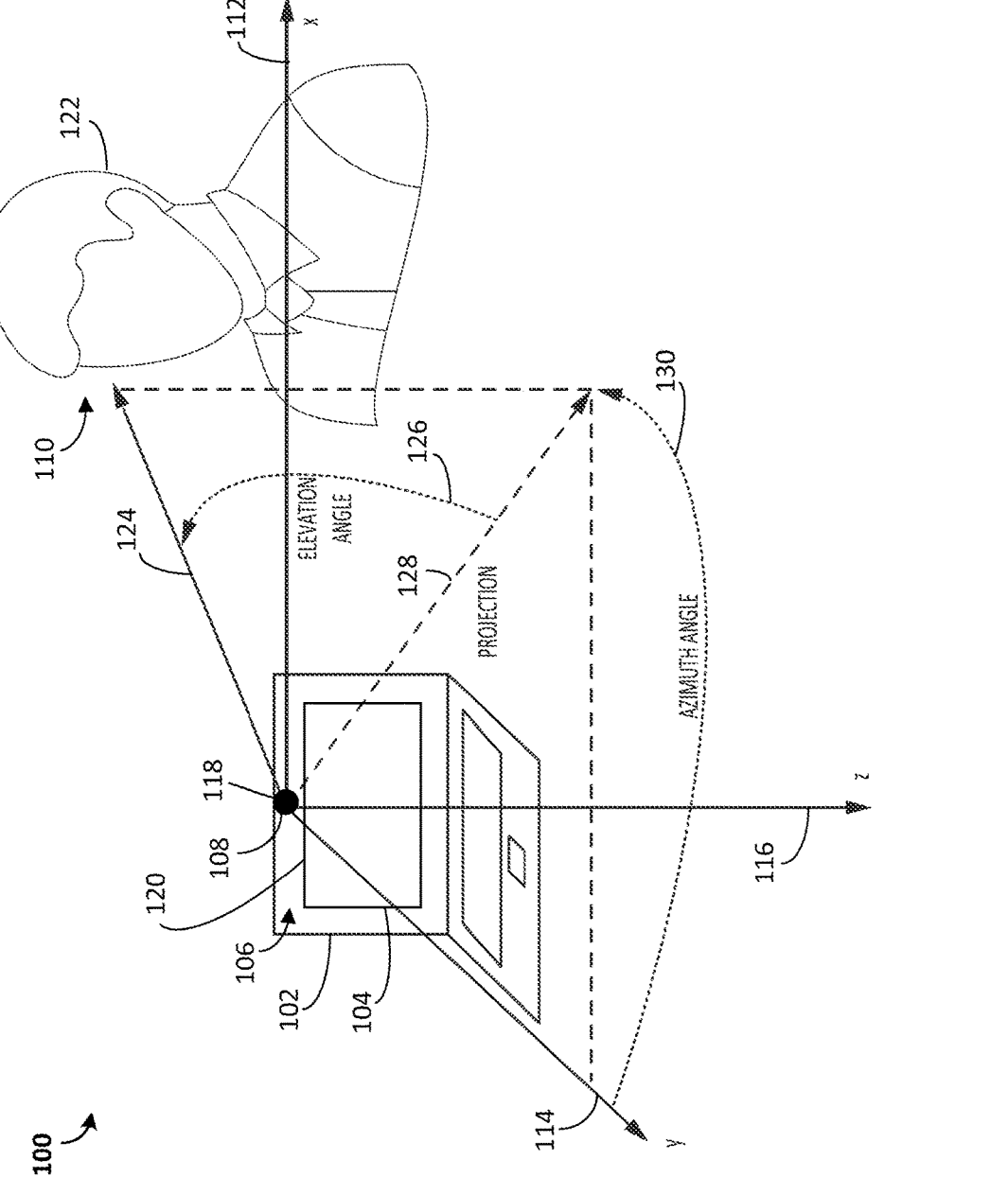
FIG. 1 depicts a system for sensor-agnostic representation of human presence information in accordance with some examples.

Examples described in this disclosure relate to systems and methods for sensor-agnostic representation of human presence information. Human presence detection supports, among other things, dynamic privacy control by enabling onlooker detection (e.g., detection of a person other than the user who is viewing or is able to view the display screen), user-attention determination (e.g., for adaptive dimming), and wake and lock controls. Onlooker detection may rely on a computer analysis of various aspects of a bystander's position and posture, such as a location orientation, and/or tilt of the person's head relative to the user's computer screen, to determine whether the person can see the user's screen and/or is looking at the user's screen. When an onlooker is detected, the computing device (e.g., software installed on the computing device) may alert the user and/or enhance the privacy of the display screen, such as by dimming the display screen, muting notifications, or otherwise making it more difficult for an onlooker to view sensitive content on the screen. Typically, human presence detection (such as onlooker detection) is implemented using computer-vision-based sensor systems in which a camera is used to capture images that are then analyzed using object-detection algorithms that rely on bounding boxes (e.g., based on drawing bounding boxes—rectangles—around objects in an image to identify the objects). The output of such systems may be, for example, a location of a top-left corner of each bounding box within the image and a location of a bottom-right corner of each bounding box, and in some cases, a depth of each bounding box relative to the camera. The locations of the top left corner and bottom right corner define the bounding box within which an object is detected. The information conveyed by the bounding-box method, however, may not provide sufficient detail about the person's face position and direction of the person's face.

More recently, other types of sensor technologies for object detection have emerged, such as ultrasonic sensors, ultrawideband sensors, and time-of-flight sensors, among others. Sensor systems based on newer sensor technologies may have various advantages over traditional camera-based systems. For example, time-of-flight (ToF) sensors, which detect the timing of reflections of emitted infrared light and use this information to construct a three-dimensional image, can provide more-accurate depth information than traditional cameras. Sensor systems that use these alternative sensor technologies may rely on techniques other than bounding-box analysis to detect and analyze the position and posture of people in the field of view of the sensor, and as a result, sensor systems based on different sensor technologies may generate and output different sets of parameters characterizing information about detected people. Thus, applications that rely on the outputs of sensor systems for human presence detection are typically customized to the particular type of sensor technology that is used, and the applications must be written to process the specific types of data that are output by the specific sensing technology. As a result, a human presence-based application written for one computing device (e.g., a laptop that includes a first type of sensing technology, such as a camera) typically cannot be run on a different computing device that includes a different type of sensing technology (such as a ToF sensor) or, in some cases, even different brands or versions of the same types of sensors that provide different outputs or representations of the detected persons. More generally, software that is written to process the outputs of a sensor system that is based on one sensing technology cannot be used to process outputs of a sensor system that is based on a different sensing technology. As the range of sensing technologies increases, this lack of standardization can lead to significant compatibility issues.

As described herein, a standardized, sensor-agnostic approach to representing information about detected persons (such as bystanders) can be used to enable an operating system (OS) and/or an application to implement human presence-related features (such as onlooker detection and privacy mitigation) independently of the sensing technology used in the sensor system that captures the information.

For example, a sensor system of a computing device with a display screen detects the presence of a first person and determines, based on a coordinate system position and posture information associated with the first person. In some examples, the coordinate system is associated with the display screen of the computing device that includes the sensor. In such examples, the coordinate system includes a first axis (e.g., an X axis) that is parallel to a top edge of the display screen, a second axis (e.g., a Y axis) that is orthogonal to a plane of the display screen, and a third axis (e.g., a Z axis) that is orthogonal to the first and second axes (e.g., the X and Y axes). In an example, the origin of the coordinate system is at a location of a sensor of the sensor system, and in some cases, in the plane of the display screen (e.g., centered with respect to a horizontal width of the display screen). Using this coordinate system, the sensor system determines various position and/or posture parameters associated with the detected person. As described in more detail herein, such parameters include an elevation (altitude) angle, an azimuth angle, a pitch, a yaw, and/or a roll of the person's head or face relative to the display screen. In an example, the sensor system detects multiple people and generates multiple corresponding sets of parameters.

The sensor system provides human presence information, including the above-described parameters, to an OS of the computing device. The OS may be configured to receive the human presence information and optionally provide, via an application programming interface (API), the human presence information to software applications installed on the computing device, such as applications that provide privacy-related features or other types of applications that utilize the human presence information discussed herein. Additionally or alternatively, the OS itself is configured to use the human presence information to implement privacy-related features or other functionality.

The above-described systems and methods for sensor-agnostic representation of human presence information enable operating systems and software applications to implement human presence detection-related features using standardized interfaces, thereby decoupling the software from the underlying sensing hardware. In addition, because the operating system handles the requests for the sensor data, the operating system can similarly control the power state of the sensor system based on the requests that are being received. For example, when no requests for sensor data are being received, the operating system may turn off the sensor system, further conserving power and bandwidth. In addition, as discussed herein, the representation of the sensor system provides a more computationally efficient format as compared to other formats, such as bounding boxes.

Additional details regarding systems and methods for sensor-agnostic representation of human presence information are described with reference to FIGS. 1-9.

FIG. 1 depicts an example system 100 for sensor-agnostic representation of human presence information. System 100 depicts a computing device 102 that has a display screen 104 surrounded by a bezel 106, with a sensor 108 located within the bezel 106 above the display screen 104. In the example of system 100, the sensor 108 is approximately centered above a top edge 120 of the display screen 104. The sensor 108 is part of a sensor system that includes processing circuitry and is configured to detect one or more persons in the field of view of the sensor 108 and determine various parameters that characterize the persons' position and posture.

The sensor 108 (e.g., the sensing hardware) may be or may include a camera, an ultrawideband sensor, an ultrasonic sensor, a LiDAR sensor, a time-of-flight (ToF) sensor, and/or any other type of sensor technology that is suitable for object detection and analysis. The sensor 108 has a field of view (e.g., an area in which the sensor 108 is capable of detecting objects) that encompasses an area in front of sensor and, in the example depicted, in front of the computing device 102. In some examples, the field of view is symmetric around a primary (central) axis protruding forward from the sensor 108.

In the example depicted in FIG. 1, a person 110 is located within the field of view of the sensor 108, and the sensor 108 detects the presence of the person 110. The person 110 may be a user of the computing device 102 or a bystander (e.g., a person other than the user of the computing device 102 who is in the field of view of the sensor 108). The sensor system analyzes signals provided by the sensor 108 to determine human presence information that includes the values of various parameters that characterize the person's position and posture based on a first coordinate system that is associated with (e.g., related to and/or defined by) a location and/or orientation of the sensor 108 and/or of the display screen 104. The first coordinate system is depicted in FIG. 1 as having an X axis 112 (e.g., a first axis), a Y axis 114 (e.g., a second axis), and a Z axis 116 (e.g., a third axis) that are mutually orthogonal, and an origin 118. The coordinate system may be considered a Cartesian coordinate system with an origin at the sensor 108.

The origin of the coordinate system may be located or positioned at different points relative to the sensor 108 and/or computing device 102. In the example of FIG. 1, the origin 118 of the first coordinate system is at the location of the sensor 108, which is roughly centered above the display screen 104 (e.g., in the middle of the portion of a bezel that is above the top edge of the display screen 104). In other examples, the sensor 108 is offset in the bezel from the center of a top edge of the display screen 104. For example, the sensor 108 may be located above the display screen 104 and offset to the right or left of the center of a top edge of the display screen 104, and the origin 118 is at the offset location of the sensor 108. In other examples, the origin 118 of the first coordinate system is at a different location than the sensor 108. For example, the origin 118 may be defined with respect to the display screen 104 rather than with respect to the sensor 108, such as in the middle portion of the bezel that is above the top edge of the display screen 104 or in the middle of a top portion of the display screen 104 itself, for example.

The first coordinate system includes an X axis 112 that is in the plane of the display screen 104 or a plane parallel to, but offset from, the display screen 104 (e.g., within 1, 3, or 5 centimeters of the plane of the display screen) and parallel to a top edge and/or a horizontal width (from the perspective of a user) of the display screen 104; a Y axis 114 that is orthogonal to the display screen 104; and a Z axis 116 that is essentially in the plane of the display screen 104 and orthogonal to the top edge and/or horizontal width of the display screen 104. In some examples, the X axis 112 is directed from the origin 118 to the right, from the perspective of a person looking directly at the display screen 104; values to the right of the origin 118 are positive and values to the left are negative. In some examples, the Y axis 114 is directed from the origin 118 to a region in front of the display screen 104; values in front of the display screen are positive and values behind the display screen are negative. In some examples, the Z axis 116 is directed from the origin 118 downwards towards the bottom of the display screen 104; values below the origin are positive and values above the origin are negative. It should be understood that the directionality of the axes (and corresponding sign of the values along the axes) can be reversed without departing from the scope of the disclosure.

In other examples, such as examples where the sensor 108 is not attached to a display or is not coplanar with the display, the various axes of the first coordinate system may be referred with reference to the sensor 108 itself. For instance, the Y axis 114 may be aligned with a central vector protruded outwards from the sensor along the center of the field of view of the sensor. The X axis 112 and the Z axis 116 may then be orthogonal to one another and to the Y axis 114, such as in a Cartesian coordinate system.

Based on signals received from the sensor 108, the sensor system determines the values of one or more of the following parameters using the above-described first coordinate system.

Distance: The sensor system determines the distance (e.g., a distance value) from the origin 118 to a head portion 122 (e.g., the head, the face, a portion of the face such as the nose or the area between the person's eyes) of the person. The distance may be represented as a distance vector 124 having a magnitude of the distance and pointing from the origin 118 of the first coordinate system to the head portion 122 of the person.

Elevation (Altitude) angle: The elevation angle 126 may indicate the angle at which the detected face is above or below the sensor system. The sensor system determines an elevation angle 126 of the head portion 122 of the person relative to the X-Y plane of the coordinate system (e.g., in degrees or radians). The elevation angle may also or alternatively be referred to as an altitude angle. In some examples, the sensor system projects the distance vector 124 onto the X-Y plane to generate a projection vector 128 and determines the elevation angle as the angle between the projection vector 128 and the distance vector 124. Positive values of elevation angle may correspond to an angle towards the positive Z axis.

Azimuth angle: The azimuth angle 30 may indicate an angle at which the face is to one lateral side or the other from the sensor system. The sensor system determines an azimuth angle 130 of the head portion 122 of the person (e.g., in degrees or radians) by determining the angle between the Y axis and the projection vector 128. The azimuth angle may represent the person's viewing position, in the X-Y plane, relative to the display screen 104. Positive values of the azimuth angle may correspond to counterclockwise rotation around the Z axis.

An operating system of the computing device 102 is configured to receive (e.g., obtain), from the sensor system, the values of the distance (e.g., the magnitude of distance vector 124), elevation angle 126, and azimuth angle 130 in a standardized format. The OS may then use these parameter values to control privacy-related functionality or implement other functionality, and/or may provide these parameter values to requesting applications via an interface, such as an API. As discussed below with reference to FIG. 2, in some examples, the sensor system determines the values of one or more additional parameters that characterize the person's posture (e.g., the person's head or face orientation and/or tilt).

Figure 2:
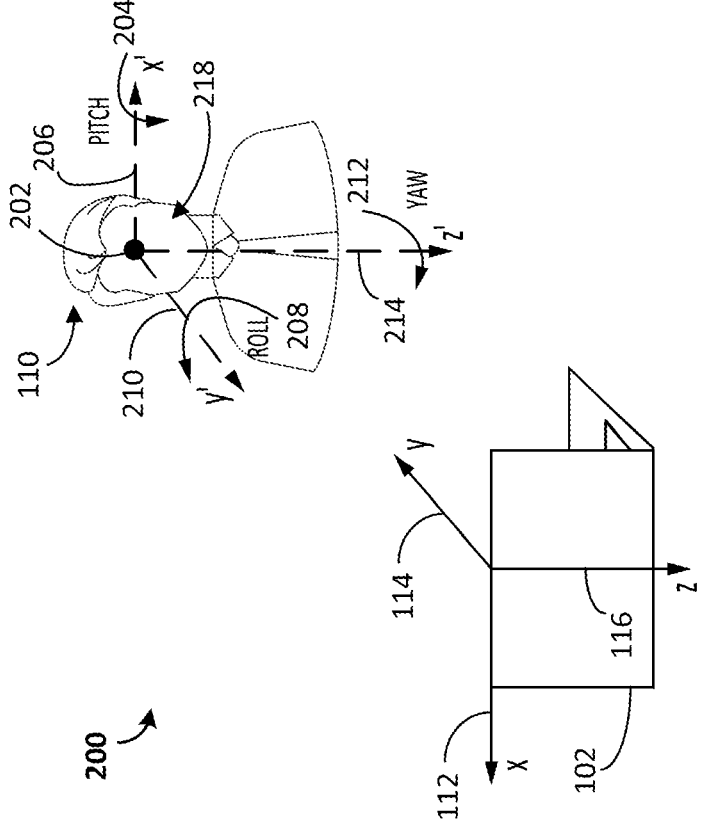
FIG. 2 depicts a system for sensor-agnostic representation of human presence information in accordance with some examples.

FIG. 2 depicts an example system 200 for sensor-agnostic representation of human presence information. System 200 includes a computing device 102 as described with reference to FIG. 1, where the computing device 102 includes a sensor system having a sensor 108.

Based on signals received from the sensor 108, the sensor system determines the values of one or more of the following parameters using a second coordinate system having an origin 202 on the face of the person 110 (e.g., located at a particular location on the person's face, such as at a point between the person's eyes or in the center of the person's nose) and having axes that are related to the above-described first coordinate system as described below.

Face pitch: The sensor system determines the face pitch 204 of the face 218 of the person 110 by determining an amount of rotation (e.g., in degrees or radians) of the face 218 about an X' axis 206 that is parallel to the X axis 112 and, in some examples, pointed in the opposite direction of the X axis 112. If the face pitch value is in degrees, the value may start from 0 and range from −180 to 180 degrees.

Face roll: The sensor system determines the face roll 208 of the face 218 of the person by determining an amount of rotation (e.g., in degrees or radians) of the face 218 about a Y' axis 210 that is parallel to the Y axis 114 and, in some examples, pointed in the opposite direction as the Y axis 114. If the face pitch value is in degrees, the value may start from 0 and range from −180 to 180 degrees.

Face yaw: The sensor system determines the face yaw 212 of the face 218 of the person by determining an amount of rotation (e.g., in degrees or radians) of the face 218 about a Z' axis 214 that is parallel to the Z axis 116 and, in some examples, pointed in the same direction as the Z axis 116. If the face pitch value is in degrees, the value may start from 0 and ranges from −180 to 180 degrees.

In some examples, the face orientation is described in Euler angles, applied in Pitch, Roll, Yaw order.

Figure 3:
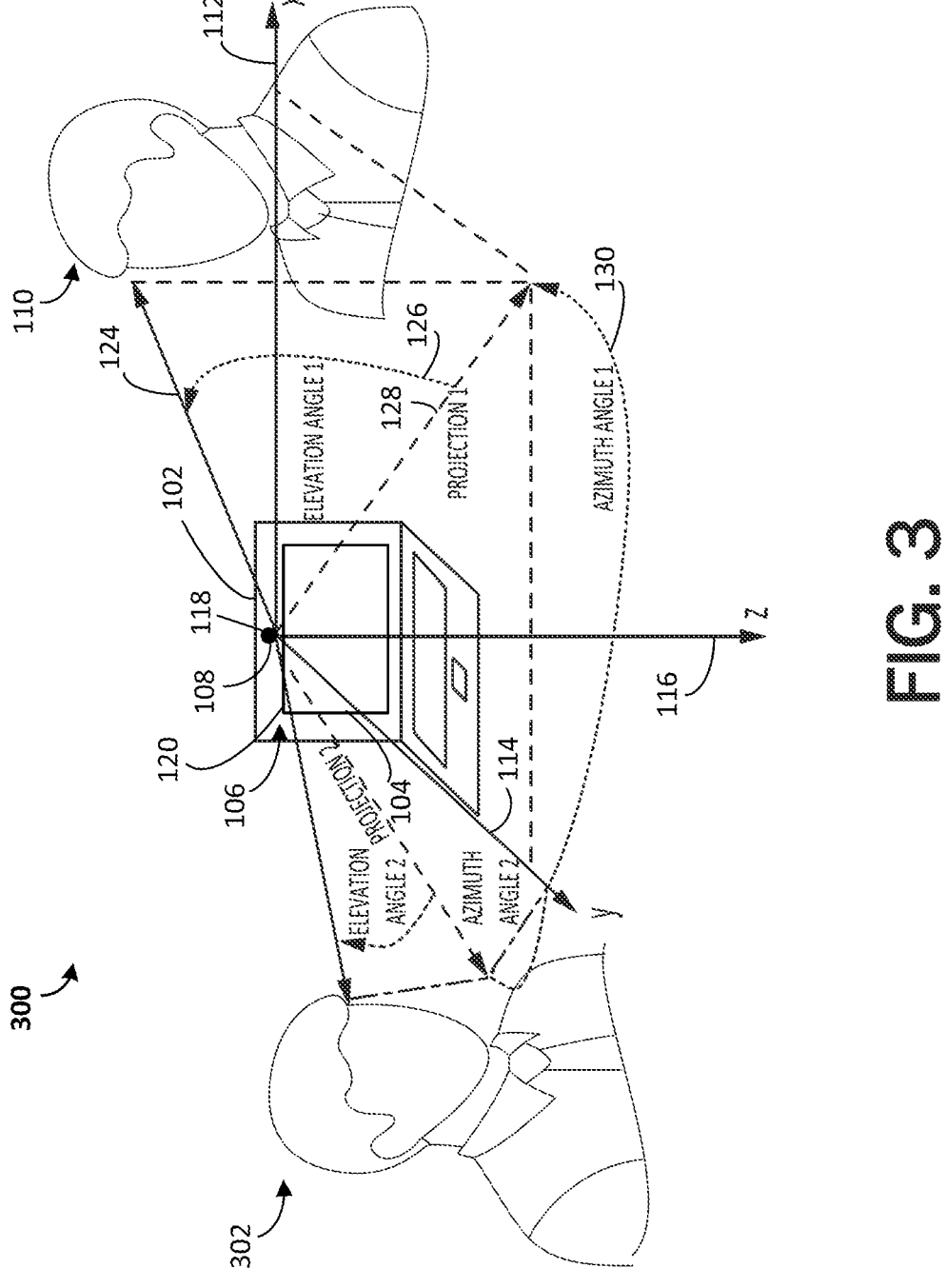
FIG. 3 depicts a system for sensor-agnostic representation of human presence information in accordance with some examples.

FIG. 3 depicts an example system for sensor-agnostic representation of human presence information. System 300 includes computing device 102 as described with reference to FIG. 1, where computing device 102 includes a sensor system having a sensor 108.

As previously discussed, newer sensor technologies may enable better and/or more efficient support for multi-person detection (e.g., for detecting multiple persons and determining position and posture information) than some camera-based machine vision systems. For example, machine-learning approaches may leverage the outputs of such sensors to provide more accurate and/or efficient detection and characterization of multiple persons.

As depicted in FIG. 3, in some examples, a sensor system detects a first person 110 (e.g., as described with reference to FIG. 1) and a second person 302 and determines the values of the above-described parameters for the first person 110 and the second person 302. For example, the sensor system determines a first set of parameter values that includes the distance, elevation angle, azimuth angle, face pitch, face roll, and/or face yaw for the first person 110 (e.g., as described with reference to FIGS. 1 and 2), and a second set of parameter values that includes the distance, elevation angle, azimuth angle, face pitch, face roll, and/or face yaw for the second person 302 (e.g., as described for the first person 110).

In some examples, the human presence information may be sent as objects that are grouped or identified by a correlation identifier for each different person that is detected. For example, a different object may be created for each different person that is detected. Each object then includes the human presence parameter values discussed herein.

In some examples, the sensor system provides the sets of parameter values to the OS of the computing device 102 as corresponding parameter arrays. For example, the sensor system may provide a distance value array that includes the distance value for the first person and the distance value for the second person; an elevation angle array that includes the elevation angle for the first person and the elevation angle for the second person, an azimuth angle array that includes the azimuth angle for the first person and the azimuth angle for the second person, a face pitch array that includes the face pitch for the first person and the face pitch for the second person, a face roll array that includes the face roll for the first person and the face roll for the second person, and a face yaw array that includes the face yaw for the first person and the face yaw for the second person.

In some examples, the sensor system orders the elements in the parameter arrays based on the corresponding distance values, with parameter values for the closest person (e.g., the shortest distance value) being placed in the first elements of the arrays. In some examples, the sensor system generates a correlation identifier for each detected person and sends a correlation identifier array indicating the correlation identifier(s) to the OS, where the correlation identifiers are ordered in the correlation identifier array in the same order as the parameter values are ordered in the parameter arrays (e.g., to enable each element of a parameter vector to be mapped to a corresponding correlation identifier).

In some examples, the sensor system sends, to the OS, an indication of the number of persons detected (e.g., an indication of the number of entries in each parameter vector). In some examples, the sensor system sends, to the OS, an indication of a maximum number of persons that the sensor system is capable of detecting.

FIG. 4 depicts example computing devices for sensor-agnostic representation of human presence information. A first computing device 400 includes a first sensor system 402 (including a first sensor 404), an operating system 406 (e.g., configured for the first computing device 400), a first application 408, and a second application 410. The first sensor 404 is a first type of sensor, such as a camera. For example, computing device 400 may be a laptop, mobile phone, tablet, or other similar devices with a built-in camera. The first application 408 and second application 410 are applications that use human presence information (e.g., generated by the first sensor system) to perform privacy-related functions or other types of functions.

A second computing device 412 includes a second sensor system 414 (including a second sensor 416), the operating system 406 (e.g., configured for the second computing device 412), the first application 408, and the second application 410. The second sensor 416 is a second type of sensor that is different from the first type of sensor (first sensor 404), such as an ultrawideband sensor, ultrasonic sensor, LiDAR sensor, ToF sensor, or another type of sensor. For example, computing device 412 may represent a second laptop with a built-in ToF sensor. Other devices with sensors may include headsets or other worn devices that detect the presence of other people surrounding the wearer.

As depicted in FIG. 4, the first application 408 and second application 410 installed on the first computing device 400 can each request, from the OS 406 installed on the first computing device 400, current human presence (HP) information (e.g., human presence information that will be determined in response to the request, such as real-time human presence information). Similarly, the first application 408 and second application 410 installed on the second computing device 412 can each request current human presence information from the OS 406 installed on the second computing device 412.

In the first computing device 400, the OS 406 responds to a first request (e.g., Request 1) from the first application 408 and a second request (e.g., Request 2) from the second application 410 by obtaining the human presence information from the first sensor system 402 (e.g., via first sensor 404). In the second computing device 412, the operating system 406 also responds to a first request (e.g., Request 1) from the first application 408 and a second request (e.g., Request 2) from the second application 410 by obtaining the human presence information from the second sensor system 414 (e.g., via second sensor 416).

In both computing device 400 and computing device 412, the operating system 406 provides the obtained current human presence information to the requestor (e.g., the first application 408 or the second application 410) via the same API. For example, the format of the human presence information provided to the first application 408 and second application 410 is the same in the first computing device 400 and the second computing device 412 and includes sensor-agnostic human presence information as described with reference to FIGS. 1-3. In this manner, applications can obtain and use human presence information from different types of sensor systems without such applications being customized for the underlying sensor technology. For instance, the first request (Request 1) from the first application 410 can be the same on first computing device 400 and the second computing device 412 despite the computing devices having different types of sensor hardware.

Figure 5A:
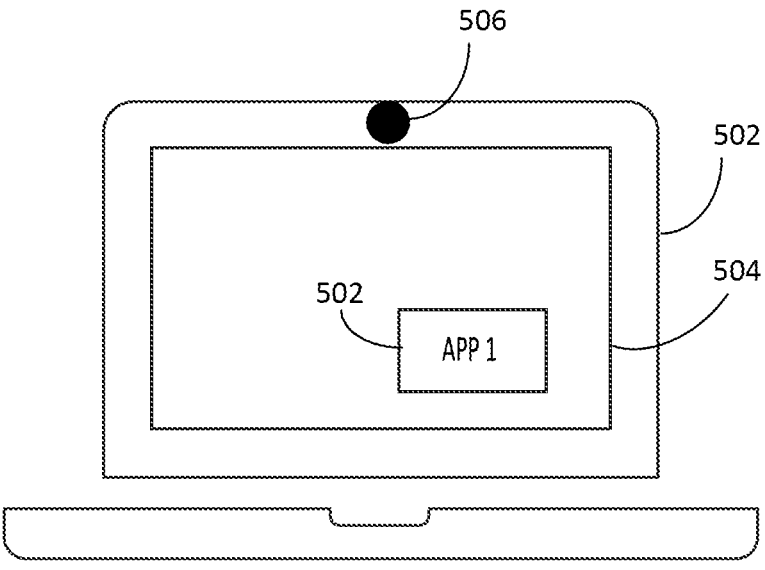
FIGS. 5A-5B depict a computing device for sensor-agnostic representation of human presence information in accordance with some examples.
Figure 5B:
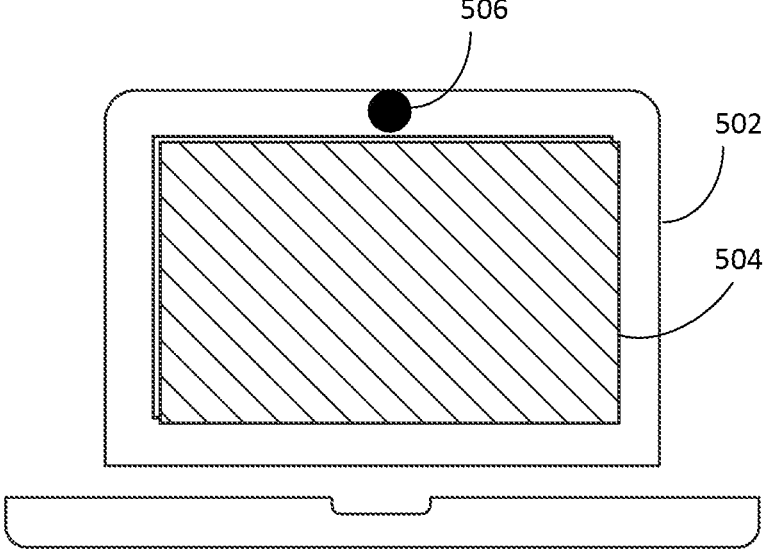

FIGS. 5A-5B depict an example of an application using the above-described sensor-agnostic human presence information to implement privacy-related functionality.

FIG. 5A depicts an example computing device 502 for sensor-agnostic representation of human presence information. Computing device 502 includes a display screen 504 and a sensor system that includes a sensor 506. A privacy-related application 508 is installed on computing device 502. The privacy-related application 508 requests human presence information from an operating system of the computing device 502, and receives the human presence information from the operating system of the computing device via an API.

From FIG. 5A to FIG. 5B, the privacy-related application 508 determines, based on the human presence information received from the operating system, that there is an onlooker of the display screen 504 (e.g., a person other than the user is looking in the direction of the display screen 504), and in response to the determination that there is an onlooker, the privacy-related application 508 dims the display screen 504. As previously discussed, such privacy-related functionality may, additionally or alternatively, be implemented in the OS itself.

FIG. 6 depicts a flowchart of a method 600 for sensor-agnostic representation of human presence information according to an example. The operations of method 600 may be performed by an operating system of a computing device, such as the operating system 406 of computing devices 400, 412 in FIG. 4 and/or the operating system 805 of computing device 800 depicted in FIG. 8. In some examples, certain operations depicted in method 600 may be combined, rearranged, or omitted.

At operation 602, an operating system receives, from a requesting application, a request for current human presence information. In some examples, the requesting application is a portion of the operating system (e.g., a human presence-based function 822 or human presence information provider 824 of operating system 805). In some examples, the requesting application is a separate application installed on the computing device (e.g., applications 408, 410 of FIG. 4 and/or one of the applications 850 of computing device 800), such as an application that performs onlooker detection analysis and provides privacy-related functions, or an application that uses human presence information for another type of functionality.

At operation 604, in response to receiving the request, the operating system obtains, from the sensor system, human presence information. Obtaining the human presence information may include transmitting, at operation 606, a request to the sensor system for the human presence information. The request may include the particular human presence parameters that are required to satisfy the request from the requesting application. The request to the sensor system may also cause the sensor system to wake or activate. At operation 608, in response to the request, the sensor system returns the requested human presence information to the operating system. The human presence may then include the human presence parameters discussed herein, such as the elevation angle, azimuth angle, pitch, roll, and/or yaw for each person detected by the sensor system. For example, the human presence information may include, for each detected person, an elevation angle (e.g., elevation angle 126) that represents an elevation of a head portion of the person (e.g., head portion 122 of person 110) relative to an X-Y plane of a first coordinate system associated with a display screen (e.g., display screen 104), where the elevation angle is an angle between a distance vector (e.g., distance vector 124) extending from the origin of the coordinate system (e.g., origin 118) to the head portion of the person and a projection, onto the X-Y plane, of the distance vector (e.g., projection 128). The human presence information may also include an azimuth angle (e.g., azimuth angle 130) that represents a viewing perspective of the head portion of the person relative to the display screen, where the azimuth angle is an angle between the Y axis of the coordinate system and the projection of the distance vector onto the X-Y plane.

At operation 610, the OS provides the human presence information to the requesting application. For example, the OS provides the human presence information to the portion of the OS that requested the human presence information and/or to an application that requested the human presence information (e.g., via an API).

At operation 612, the operating system may perform an operating system control function, such as a privacy function disclosed herein. The operating system control function may be a function that controls one or more hardware devices of the computing system, such as the display. In other examples, the operating system control function may be a non-hardware function that is controlled by the operating system, such as unlocking the computing device, logging into the computing device, and/or other functions of the operating system that may be based on human presence.

Method 600 may then be repeated for subsequent requests. For instance, the same requesting application may send a subsequent request. A second or different requesting application may also send a request. As discussed above, the requests from the different applications may be in the same or similar syntax due to the standardization of the human presence data that is agnostic to the specific sensor hardware.

Figure 7:
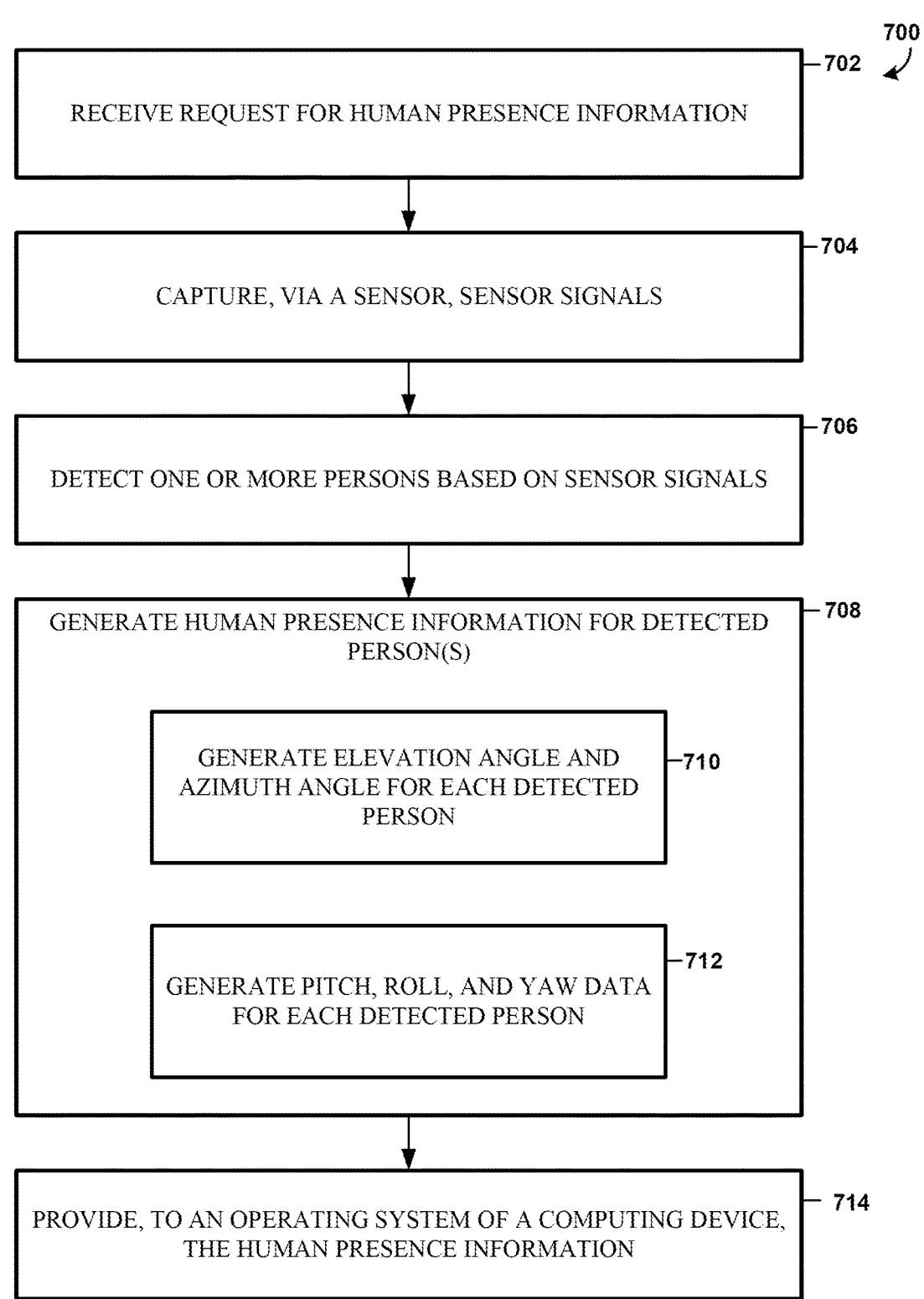
FIG. 7 depicts a flowchart of an example method for sensor-agnostic representation of human presence information in accordance with some examples.

FIG. 7 depicts a flowchart of a method 700 for sensor-agnostic representation of human presence information according to an example. The operations of method 700 may be performed by a sensor system, such as the sensor system 820 of computing device 800 depicted in FIG. 8 and/or the sensor system 900 depicted in FIG. 9. In some examples, certain operations depicted in method 700 may be combined, rearranged, or omitted.

At operation 702, a request for human presence information is received from an operating system. The request may cause the sensor to awaken or activate. In some examples, the request may be omitted and the sensor system may provide the human presence information on a more continuous basis (e.g., at a sampling interval). The sensor may be a camera, an ultrawideband sensor, an ultrasonic sensor, a LiDAR sensor, a time-of-flight sensor, or another type of sensor.

At operation 704, sensor signals are captured by the sensor. For instance, in examples where the sensor are of a radar, LiDAR, time-of-flight, or other sensor that utilizes the transmission of a signal (e.g., light), the sensor signals that are captured are the reflections of the transmitted signals. In other examples where the sensor is a camera, capturing the sensor signals may include capturing an image of the field of view of the sensor.

At operation 702, based on the captured sensor signals, the sensor system detects one or more persons (e.g., person 110, person 302, and/or other persons in the field of view of the sensor). The one or more persons may include, for example, the user of a computing device connected to (e.g., including or coupled with) the sensor system and/or bystanders (e.g., people other than the user of the computing device). The detection of the person(s) may be performed by the hardware of the sensor system, such as through the use of one or more trained machine learning models.

At operation 708, the sensor system generates, via processing circuitry of the sensor system (e.g., processing circuitry 904), human presence information for the detected person(s). Generating the human presence information includes generating at least a portion of the parameters discussed herein. For instance, at operation 710 an elevation angle and an azimuth angle may be generated for each detected person. Additionally or alternatively, at operation 712, pitch, roll, and yaw data for each detected person is generated.

At operation 714, the sensor system provides, to an operating system of the computing device (e.g., operating system 406 of computing devices 400, 412 in FIG. 4 and/or operating system 805 of computing device 800 depicted in FIG. 8), the human presence information.

While the foregoing discussion has generally discussed the X-Y plane being one that is orthogonal to a plane of the display screen, in other examples, planes other than the display screen may be used for setting a reference frame of the coordinate system. For instance, a ground plane (e.g., plane that is parallel to the ground) may be used to align the X-Y plane parallel to the ground. In other examples, the sensor itself may provide the Y axis as being directly outward from the sensor, the X axis being to the side of the sensor, and the Z axis being downward from the sensor.

Figure 8:
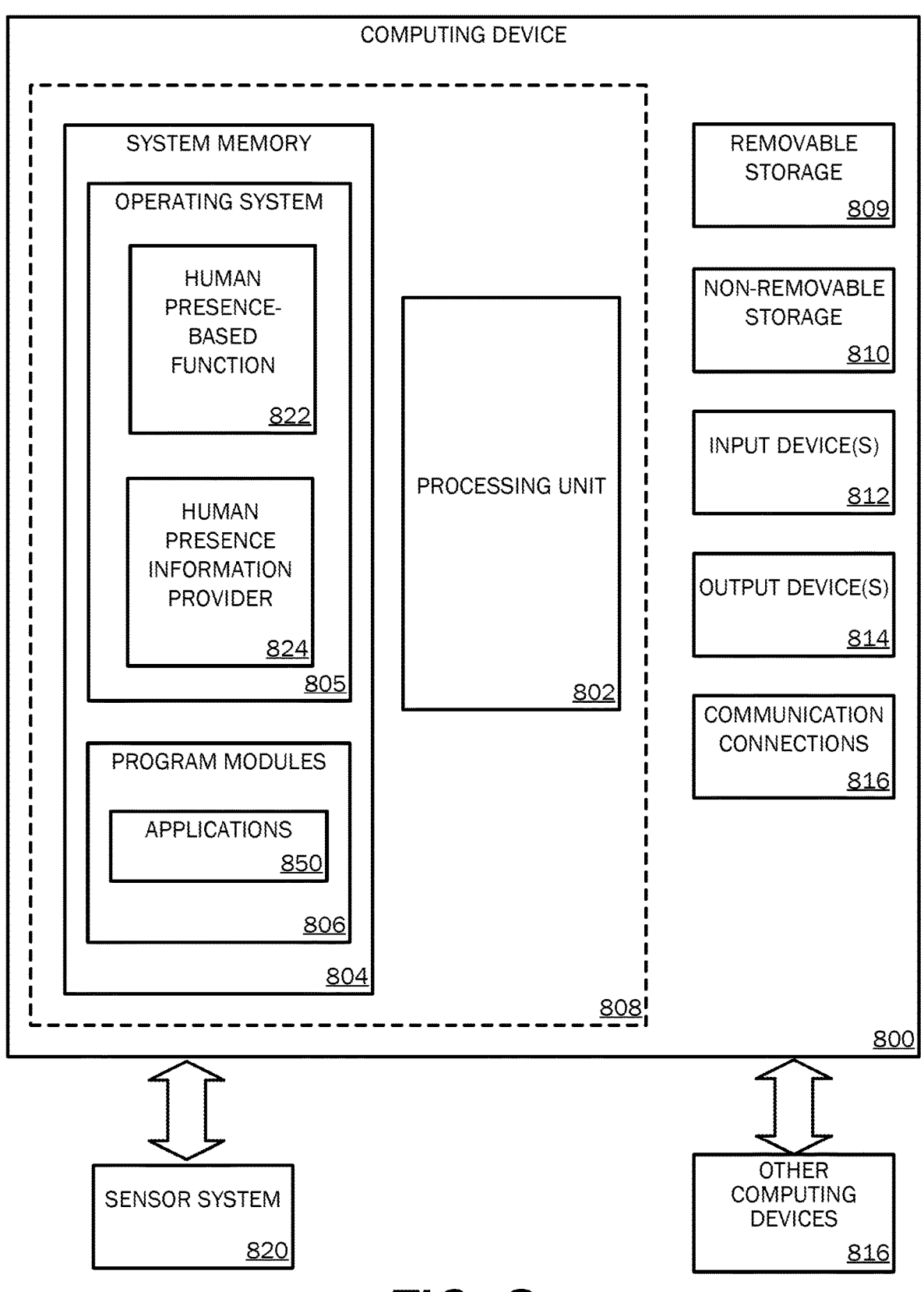
FIG. 8 is a block diagram illustrating example physical components of a computing device with which aspects of the disclosure may be practiced.

FIG. 8 and the associated description provides a discussion of a variety of operating environments in which examples of the disclosure may be practiced. However, the devices and systems illustrated and discussed with respect to FIG. 8 are for purposes of example and illustration; a vast number of computing device configurations may be utilized for practicing aspects of the disclosure described herein.

FIG. 8 is a block diagram illustrating physical components (e.g., hardware) of an example of a computing device 800 with which examples of the present disclosure may be practiced. The computing device components described below may be suitable for one or more of the components of the systems 100, 200, and/or 300 described above. In a basic configuration, the computing device 800 includes at least one processing unit 802 (e.g., at least one processor) and a system memory 804. Depending on the configuration and type of computing device 800, the system memory 804 may comprise volatile storage (e.g., random access memory), non-volatile storage (e.g., read-only memory), flash memory, or any combination of such memories. In the example of FIG. 8, the system memory 804 includes an operating system 805 and program modules 806 for performing various functionalities, including applications 850. In the example of FIG. 8, the operating system 805 includes instructions for implementing a human presence-based function 822 (e.g., for using human presence information to perform a function, such as a privacy-related function) and a human presence information provider 824 (e.g., for obtaining human presence information and providing the human presence information to one or more of the applications 850).

The operating system 805 may be suitable for controlling the operation of the computing device 800, such as scheduling tasks, controlling peripheral devices, and managing other aspects of software, hardware, and input/output (I/O) on the computing device 800.

Aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 and/or operating system 805 may perform processes including one or more of the stages of method 600. In some examples, such processes and methods may be distributed across multiple processing units 802, such that each processing unit 802 performs a portion of the processes and methods.

In the example of FIG. 8, the computing device 800 also has one or more input device(s) 812 (such as a keyboard, a mouse, a pen, a sound input device, a touch input device, a camera, etc.) and output device(s) 814 (such as a display screen, speakers, a printer, etc.). The aforementioned devices are examples and others may be used. In some examples, the computing device 800 omits the input device(s) 812 and/or output devices 814. In the example of FIG. 8, the computing device 800 includes one or more communication connections 816 to enable communications with other computing devices 818 and/or with a sensor system 820. In some examples, the sensor system 820 is included in the computing device 800. Examples of communication connections 816 include an RF transmitter, receiver, and/or transceiver circuitry; universal serial bus (USB), parallel ports, and/or serial ports.

Figure 9:
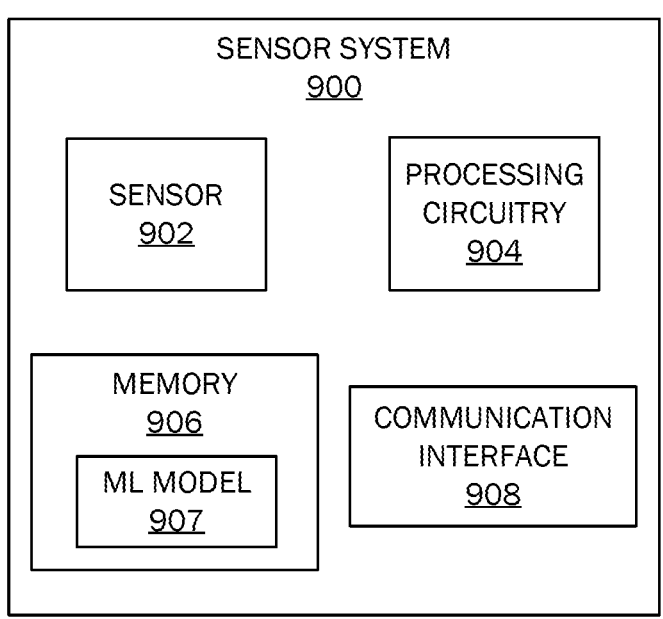
FIG. 9 is a block diagram illustrating example physical components of a sensor system with which aspects of the disclosure may be practiced.

FIG. 9 is a block diagram illustrating physical components (e.g., hardware) of an example of a sensor system 900 with which examples of the present disclosure may be practiced. In a basic configuration, the sensor system 900 includes a sensor 902, processing circuitry 904, memory 906, and one or more communication connections or interfaces 908. The sensor 902 may be a camera, an ultrawideband sensor, an ultrasonic sensor, a LiDAR sensor, a ToF sensor, or any other type of sensor suitable for human presence detection. The communication interfaces 908 are configured to enable communication of human presence information between the sensor system 900 and an operating system of a computing device (e.g., operating system 905), along with other information. The processing circuitry 904 may include a processing unit (such as described with reference to FIG. 8) or any other type of circuitry that is capable of determining the human presence information as described herein. The memory 906 includes instructions for performing the respective sensing techniques as well as the analysis of such techniques. For instance, the memory 906 may include a trained machine learning model that receives, as input, sensor signals that are captured by the sensor 902. The trained machine learning model then processes the sensor signals to detect the person(s) within the field of view and generate the human presence parameters discussed herein.

Examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 and/or FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 800 on the single integrated circuit (chip). Examples of the present disclosure may also be practiced using other technologies capable of performing logical operations such as, for example, AND, OR, and NOT, including mechanical, optical, fluidic, and quantum technologies.

The term computer readable media as used herein includes volatile and nonvolatile, removable and non-removable media implemented in any method or technology for storage of information, such as computer readable instructions, data structures, or program modules. The system memory 804, the removable storage devices 809, and the non-removable storage devices 810 of FIG. 8 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer readable media may be part of the computing device 800. In some examples, computer readable media includes non-transitory computer readable media and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a computing device for verifying user-selected configuration settings. The computing device includes at least one processor; and memory storing instructions that, when executed individually or collectively by the at least one processor, cause the computing device to perform operations. The operations include receiving It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from transmission media, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computing device for detecting human presence, the computing device comprising:

at least one processor;

a display screen;

a sensor system comprising a sensor positioned adjacent the display screen; and memory storing instructions that, when executed by the at least one processor, cause the computing device to perform operations comprising:

receiving, by an operating system of the computing device from a first application, a first request for human presence information;

in response to receiving the first request, obtaining, by the operating system, first human presence information, from the sensor system, indicating a position of one or more humans relative to the display screen, the first human presence information comprising:

a first elevation angle that represents an elevation of a head portion of a first person relative to a plane of a first coordinate system associated with the sensor, wherein;

the plane is orthogonal to a plane of the display screen; and the elevation angle is an angle between a distance vector extending from an origin of the first coordinate system to the head portion of the first person and a projection of the distance vector onto the plane, and a first azimuth angle that represents a viewing perspective of the head portion of the first person relative to the sensor, wherein the azimuth angle is an angle between an axis of the first coordinate system and the projection of the distance vector onto the plane; and providing the first human presence information to the first application.

2. The computing device of claim 1, wherein the origin of the first coordinate system is at a location of the sensor.

3. The computing device of claim 1, wherein the first human presence information further comprises a face pitch, a face roll, and a face yaw associated with a face of the first person, the face pitch, the face roll, and the face yaw determined based in part on a second coordinate system having axes that are parallel to axes of the first coordinate system and a second origin associated with the face of the first person.

4. The computing device of claim 1, wherein the first human presence information further comprises:

a detected number of persons;

a second elevation angle associated with a second person; and a second azimuth angle associated with the second person.

5. The computing device of claim 1, wherein the instructions further cause the computing device to perform operations comprising:

determining, based on the first human presence information, the first person is an onlooker; and in response to the determination that the first person is an onlooker, causing a privacy function to be performed.

6. The computing device of claim 5, wherein the privacy function includes at least one of dimming the display screen, muting notifications, or issuing an alert.

7. The computing device of claim 1, wherein the first human presence information is provided to the first application via an application program interface (API) of the operating system.

8. The computing device of claim 1, wherein the instructions further cause the computing device to perform operations comprising:

receiving, by the operating system from a second application, a second request for human presence information; and in response to receiving the second request:

obtaining, from the sensor system, second human presence information comprising:

a second elevation angle associated with a second person, a second azimuth angle associated with the second person, and providing the second human presence information to the second application via an application program interface (API) of the operating system.

9. The computing device of claim 8, wherein the second human presence information further comprises a face pitch, a face roll, and a face yaw associated with a face of the second person.

10. The computing device of claim 1, wherein the sensor is an ultrawideband sensor, an ultrasonic sensor, a LiDAR sensor, or a time-of-flight (ToF) sensor.

11. The computing device of claim 1, wherein the sensor is positioned with a bezel.

12. A sensor system for detecting persons of a computing device, the sensor system comprising:

processing circuitry; and a sensor positioned adjacent a display screen of the computing device;

wherein the sensor system is configured to:

capture, by the sensor, sensor signals;

detect one or more persons based on the captured sensor signals;

determine, via the processing circuitry, human presence information indicating a position of one or more humans relative to the display screen, wherein the human presence information includes first human presence information for a first person of the one or more persons, the first human presence information comprising:

a first elevation angle that represents an elevation of a head portion of the first person relative to a plane of a first coordinate system associated with the sensor, wherein the first elevation angle is an angle between a first distance vector extending from an origin of the first coordinate system to the head portion of the first person and a projection of the first distance vector onto the plane, and a first azimuth angle that represents a viewing perspective of the head portion of the first person relative to the sensor, wherein the azimuth angle is an angle between an axis of the first coordinate system and the projection of the distance vector onto the plane; and provide, to an operating system of the computing device, the human presence information.

13. The sensor system of claim 12, wherein an X-Y plane is orthogonal to a plane of a display screen.

14. The sensor system of claim 12, wherein the origin of the first coordinate system is centered relative to a horizontal width of a display screen.

15. The sensor system of claim 12, wherein the origin of the first coordinate system is at a location of the sensor.

16. The sensor system of claim 12, wherein the sensor system is further configured to:

determine, based on a second coordinate system having axes that are parallel to axes of the first coordinate system and a second origin associated with a face of the first person, a face pitch, a face roll, and a face yaw associated with the face of the first person, wherein the first human presence information includes the face pitch, face roll, and face yaw associated with the face of the first person.

17. The sensor system of claim 12, wherein the one or more persons includes a second person and the sensor system is further configured to:

determine a number of detected persons including the first person and the second person; and determine a second elevation angle associated with the second person and a second azimuth angle associated with the second person, wherein providing the human presence information to the operating system includes providing:

an indication of the number of detected persons;

an array of elevation angles including the first elevation angle and the second elevation angle; and an array of azimuth angles including the first azimuth angle and the second azimuth angle, wherein a number of elements in the array of elevation angles and a number of elements in the vector of azimuth angles correspond to the number of detected persons.

18. A computer-implemented method for detecting human presence, the method comprising:

receiving, by an operating system of a computing device from an application, a request for human presence information for a plurality of persons detected by a sensor system positioned adjacent a display screen of the computing device;

in response to receiving the request, transmitting, by the operating system to the sensor system, a request for the human presence information;

receiving, from the sensor system, human presence information for a first detected person and a second detected person, wherein:

the human presence information indicates a position of the first detected person and a position of the second detected person relative to the display screen;

the human presence information for the first detected person includes a first elevation angle, a first azimuth angle, a first face pitch, a first face roll, and a first face yaw; and the human presence information for the second detected person includes a second elevation angle, a second azimuth angle, a second face pitch, a second face roll, and a second face yaw; and providing the human presence information to the application.

19. The method of claim 18, wherein:

the first elevation angle that represents an elevation of a head portion of a first person relative to a plane of a first coordinate system associated with a sensor of the sensor system, wherein the elevation angle is an angle between a distance vector extending from an origin of the coordinate system to the head portion of the first person and a projection of the distance vector onto the plane; and the first azimuth angle that represents a viewing perspective of the head portion of the first person relative to the sensor, wherein the azimuth angle is an angle between an axis of the coordinate system and the projection of the distance vector onto the plane.

20. The method of claim 19, wherein the first face pitch, the first face roll, and the first face yaw are determined based on a second coordinate system having axes that are parallel to axes of the first coordinate system and a second origin associated with the face of the first person.

* * * * *